United States Patent [19]
Smith

[11] Patent Number: 5,887,584
[45] Date of Patent: Mar. 30, 1999

[54] SOLAR ENERGY ABSORBING DEVICE FOR MELTING SNOW FROM AN INCLINED ROOF

[76] Inventor: Daryle R. Smith, 831 Shawmut Ct., NW., Grand Rapids, Mich. 49504-3764

[21] Appl. No.: 69,021

[22] Filed: Apr. 27, 1998

[51] Int. Cl.⁶ .................................................. F24J 2/00
[52] U.S. Cl. .............................. 126/569; 169/904; 169/47
[58] Field of Search ....................... 165/904, 47; 126/569

[56] References Cited

U.S. PATENT DOCUMENTS

| | | | |
|---|---|---|---|
| 3,207,211 | 9/1965 | Winterfeldt | 165/47 |
| 3,366,168 | 1/1968 | Dale | 165/47 |
| 3,388,738 | 6/1968 | Dery | 165/47 |
| 4,224,923 | 9/1980 | Wells | 126/417 |
| 4,252,183 | 2/1981 | Ricciardelli | 165/47 |
| 4,261,417 | 4/1981 | Tingley | 165/47 |
| 4,291,673 | 9/1981 | Deutz | 126/417 |
| 4,333,444 | 6/1982 | Sell et al. | 126/417 |
| 4,375,805 | 3/1983 | Weber | 126/417 |
| 4,432,341 | 2/1984 | Howe et al. | 126/417 |
| 4,606,402 | 8/1986 | Dupre | 165/47 |
| 4,763,450 | 8/1988 | Daniel | 52/24 |

*Primary Examiner*—Carroll B. Dority
*Attorney, Agent, or Firm*—Price, Heneveld, Cooper, DeWitt & Litton

[57] ABSTRACT

A solar energy absorbing device for melting snow from an inclined roof includes a plurality of interconnected elements which form a non-planar geometric structure wherein at least one of the interconnected elements is fabricated of a solar absorptive material and further where the geometric structure remains stationary when placed on an inclined roof of a building.

14 Claims, 3 Drawing Sheets

SOLAR ENERGY ABSORBING DEVICE FOR MELTING SNOW FROM AN INCLINED ROOF

BACKGROUND OF THE INVENTION

The present invention relates to snow removal systems for inclined roofs, and in particular to a removable thermal energy absorbing device to hasten the melting of snow on an inclined roof.

Many buildings and especially residences are constructed with inclined roofs. Depending upon the particular design and construction, the inclination or pitch of the roof can range from shallow to steep, and are typically covered with overlapping shingles to prevent water from entering the roof and seeping into the underlying structure. A shingled pitched roof is generally quite effective in preventing water from entering the underlying structure during rain storms and other inclement weather.

Winter months in many climates is evidenced by freezing temperatures and precipitation occurring in the form of snow. Depending upon the temperature, consistency of the snow, wind, and the pitch of the building roof, snow may tend to accumulate on roofs which have a relatively shallow pitch. The snow accumulation on a roof will remain there until it is either removed or it melts. Removal of snow from a roof is typically a hazardous operation requiring someone to climb upon the roof and shovel the snow off. Typically, building occupants and owners wait until the snow melts from direct solar radiation or from rising surrounding air temperatures.

Natural thawing of the snow from the roof does not occur all at once, consequently the snow on the roof is subjected to cycles of freezing and thawing. The freezing and thawing cycles tend to create an ice dam at the lower portions of the roof such that the ice dam tends to trap water behind it and not allow the water to drain off the roof. The trapped water will then often "wick" back underneath the overlapping portion of the shingles and enter the building through small gaps or cracks in the roof structure under the shingles. Such entry of water into the underlying structure can cause damage to interior walls and ceilings and decrease the efficiency of insulation when the insulation becomes waterlogged.

Thus, there is a need to facilitate and hasten the melting of snow from the roof without requiring the building occupant or owner to climb upon the roof to shovel the snow therefrom. By hastening the melting and removal of the snow from the roof, the potential for ice dams and water backing up underneath the shingles is greatly reduced. Heretofore, systems to facilitate and speed the melting of snow from the roof have required the permanent installation of the system to the roof. These permanent systems have certain drawbacks and disadvantages, particularly with respect to the need to incorporate the system along the entire length of the roof thereby incurring a permanent presence of the system on the roof even during summer months and detracting from the aesthetics of the building.

SUMMARY OF THE INVENTION

One aspect of the present invention is a solar energy absorbing device for melting snow from an inclined roof which includes a plurality of interconnected elements forming a non-planar geometric structure. At least one of the elements of the non-planar geometric structure is fabricated of a solar energy absorbing material. The geometric structure remains stationary when placed on an inclined roof of a building.

Another aspect of the present invention is a method of removing snow from an inclined roof including the steps of providing a plurality of thermal energy absorbing elements, assembling the elements into at least one non-planar geometric structure, placing the non-planar geometric structure on an inclined roof, and allowing the non-planar geometric structure to absorb solar energy and transfer the absorbed energy to snow on the inclined roof to melt the snow.

The principle objects of the present invention are to provide a thermal energy absorbing device which can be selectively placed on snow covered areas of a roof and after the thawing of the snow removing the structure from the roof. The structures can be assembled in such a manner that in at least one orientation thereof the structure will remain on an inclined room without tumbling off. The energy absorbing structures can be thrown on the roof into the snow covered areas of the roof by an individual standing at ground level or from an area close to the roof without necessitating walking upon the snow covered inclined roof.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
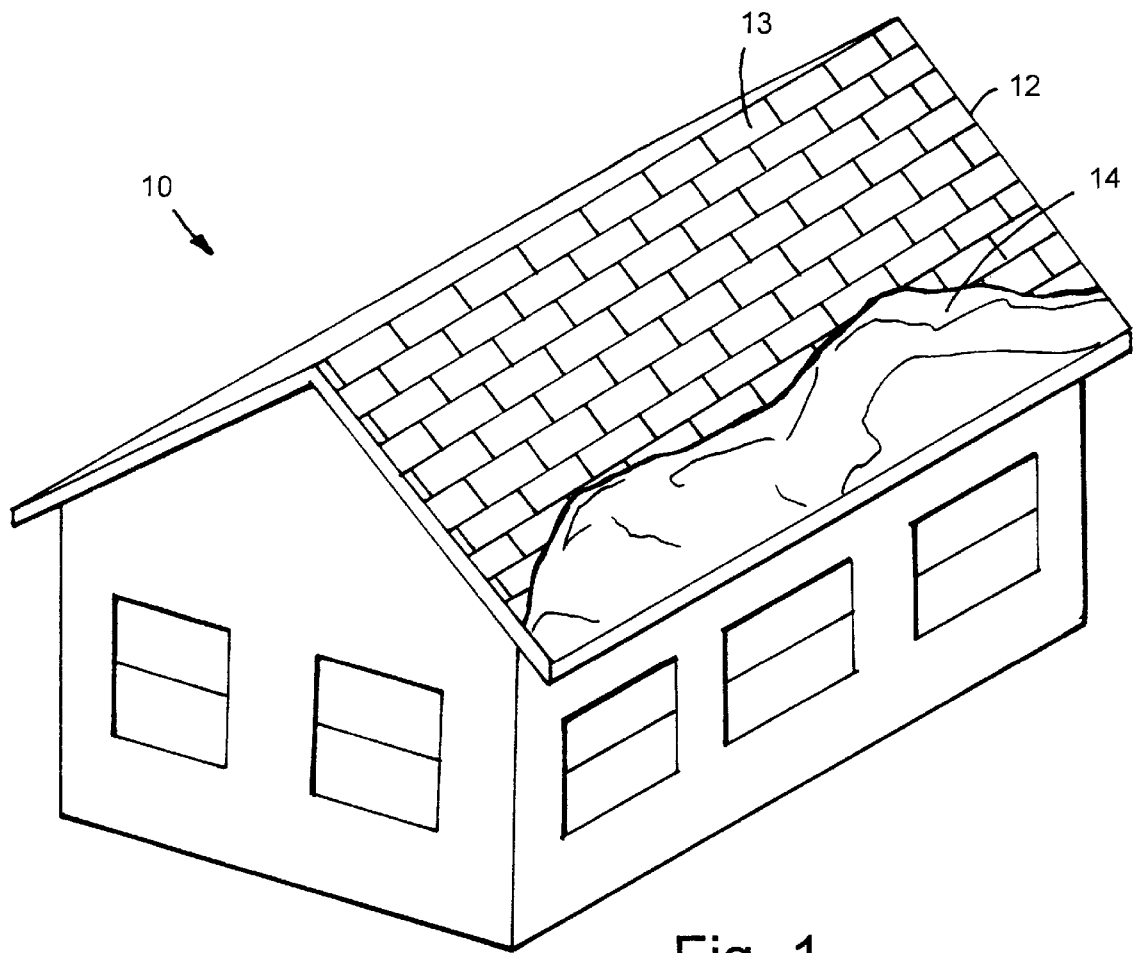
FIG. 1 is a perspective view of a building with an inclined roof covered with shingles thereon showing snow accumulation on part of the roof.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 shows a building 10 having an inclined roof 12 which is covered with overlapping shingles 13. Accumulated snow 14 covers a lower portion of roof 12 and shingles 13, thereby presenting a potential dam 19 (FIG. 3) for retaining a portion of water 17 (FIG. 3) flowing down from an upper portion of inclined roof 12.

Figure 2:
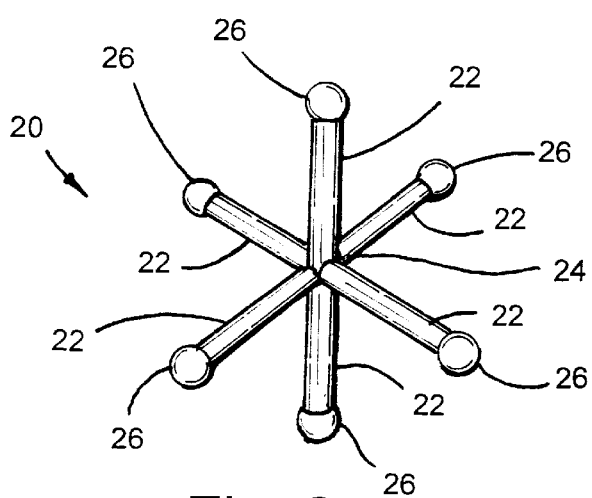
FIG. 2 is a perspective view of the solar energy absorbing device embodying the present invention, wherein rod-like elements are joined in a mutually orthogonal configuration.

Referring now to FIG. 2, a preferred embodiment of a solar energy absorbing device 20 is illustrated. Energy absorbing device 20 has a plurality of rods 22 joined at a common intersecting point 24. Free ends of rods 22 are terminated and formed as knobs 26, thus presenting a configuration of three mutually orthogonal longer rods which have a common intersecting point 24. Rod elements 22 are typically fabricated from a material which readily absorbs solar energy such as a dark or black colored moldable resin, although other materials and color coatings can be utilized with similar effect. Rods 22 may be joined in any of a number of ways known in the art to orthogonally join rods in an end-to-end manner such as with a multi-apertured connector (not shown) or device 20 can be molded as a one-piece structure.

Figure 3:
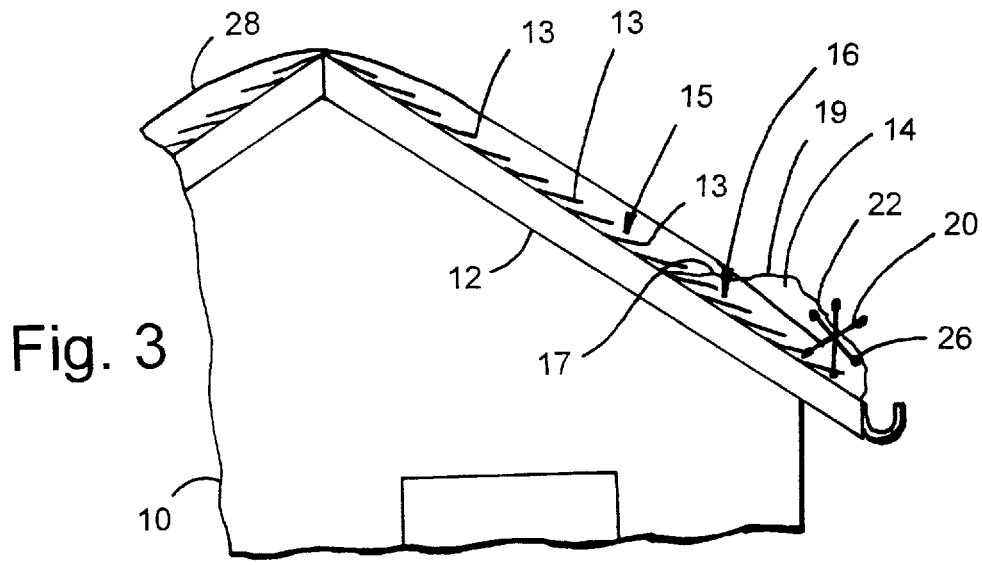
FIG. 3 is a partial elevational view of the building and snow covered roof shown in FIG. 1 positioned in the accumulated snow on the roof to absorb and transfer solar energy to the accumulated snow.

Referring now to FIG. 3, a side elevational view of inclined roof 12 is shown and also shows the overlapping nature of shingles 13 covering roof 12. Adjacent overlapping shingles 13 can have small gaps 15 therebetween which facilitate the transfer of standing water 17 underneath the shingles by capillary action. Accumulated snow 14 on a lower portion of roof 12 can function as a dam 19 and thereby trap water 17 flowing down from an upper portion of roof 12 in a trough like area 16. Water 17 standing in trough-like area 16 and covering gaps 15 will flow underneath shingles 13 and potentially through other gaps in roof 12 and into building 10 thereby damaging insulation and interior walls and ceilings.

Placing thermal energy absorbing device 20 on the lower portion of roof 12 in contact with, and preferably at least partially buried in, accumulated snow 14 will help facilitate the rapid melting of accumulated snow 14. Energy absorbing device 20 contacts roof 12 with any three adjacent knobs 26 and is thus stable in any orientation to maintain its desired location on roof 12 without tumbling or rolling off roof 12. Although shingles 13 absorb some solar energy and transfer that energy to accumulated snow 14 to assist in the melting thereof, this is accomplished only at the peripheral edges of accumulated snow 14 and does not facilitate a rapid thawing of the snow. With one or more of thermal energy absorbing devices 20 placed in accumulated snow 14 at least one and preferably more of rod segments 22 protrude from snow 14 and are exposed to solar rays. The dark color and the thermal absorptive characteristics of device 20 readily transfer the absorbed solar energy to others of rods 22 which are embedded in the snow and in turn transfer the energy to the snow 14 and thus hasten the melting of the snow in the area surrounding device 20 and exposing additional roof area to further hasten melting of the snow, thereby minimizing the exposure of shingles 13 to water trapped by accumulated snow 14.

Because thermal energy absorbing device 20 is now resting on roof 12 in a non-permanent fashion, devices 20 may be deployed according to the desires and perceived need of the owner or occupant of building 10. Thus, any number of devices 20 can be deployed upon roof 12 and concentrated in the areas upon which snow has accumulated. Devices 20 can be pre-deployed in the fall of the year so that they function throughout the winter months and can then be removed in the spring. Alternatively, devices 20 can be deployed on an as-needed basis during times of particularly troublesome snow accumulation. While deployment can always be accomplished by climbing a ladder and placing devices 20 at preselected positions, placement of the devices can also be accomplished by standing on the ground or in proximity to roof 12 and throwing devices 20 onto the accumulated snow 14 desired to be melted. A tether 28 can be affixed to device 20 and anchored to the building structure to ensure device 20 remains in its desired location or when used on a more steeply pitched roof. When devices 20 have facilitated the melting of the snow and are no longer desired to be on roof 12, the devices 20 can be snagged with long handled implements such as a garden rake or a long pole and pulled down off roof 12 thereby precluding the need for the user to climb upon the roof to retrieve devices 20. Devices 20 can be stored in a convenient storage area throughout the spring, summer, and fall months when they are not needed and thus will not detract from the aesthetics of the building during those months and further will not be exposed to weather factors during this time period which may operate to degrade their functionability as would occur to a permanently installed system.

Figure 4:
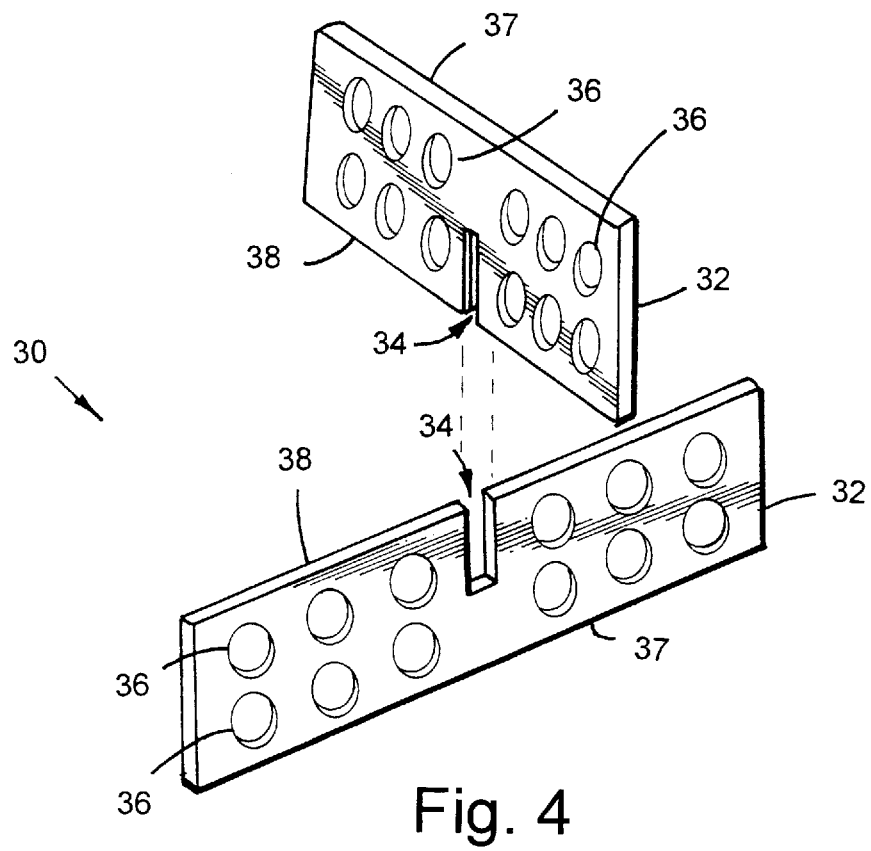
FIG. 4 is an exploded perspective view of an alternate embodiment of the solar energy absorbing device comprising two interconnecting planar elements.

Referring now to FIG. 4, an alternate embodiment solar energy absorbing device 30 is shown in exploded perspective view. Device 30 generally comprises two identical plates 32 fabricated from a solar absorptive material and can also be of a dark or black color to more readily absorb solar energy. Each plate 32 has a continuous long edge 37 and an opposite interrupted edge 38. A slot 34 is positioned substantially at a midpoint of the long dimension of plate 32 extending inwardly from interrupted edge 38 approximately half way through the width of plate 32. Plates 32 can also have therein one or more holes 36 to decrease the weight of plate 32. To assemble device 30, two plates 32 are arranged edgewise one to the other and at right angles to each other with interrupted edges 38 of each plate 32 facing each other. Slots 34 are aligned and plates 32 are pushed together such that slots 34 each capture therein a portion of the oppositely mated plate 32. The mated plates 32 now form a cruciform wherein an interrupted edge 38 of a first plate 32 is substantially coplanar with the long edge 37 of the second plate 32. Slots 34 can have a width which is slightly less than the thickness of plates 32 such that when the first and second plates 32 are mated, slots 34 frictionally receive the opposing plate 32 and thereby retain the plates in the assembled relationship during use and permit the ready disassembly of plates 32 for convenient storage after completion of use.

Figure 5:
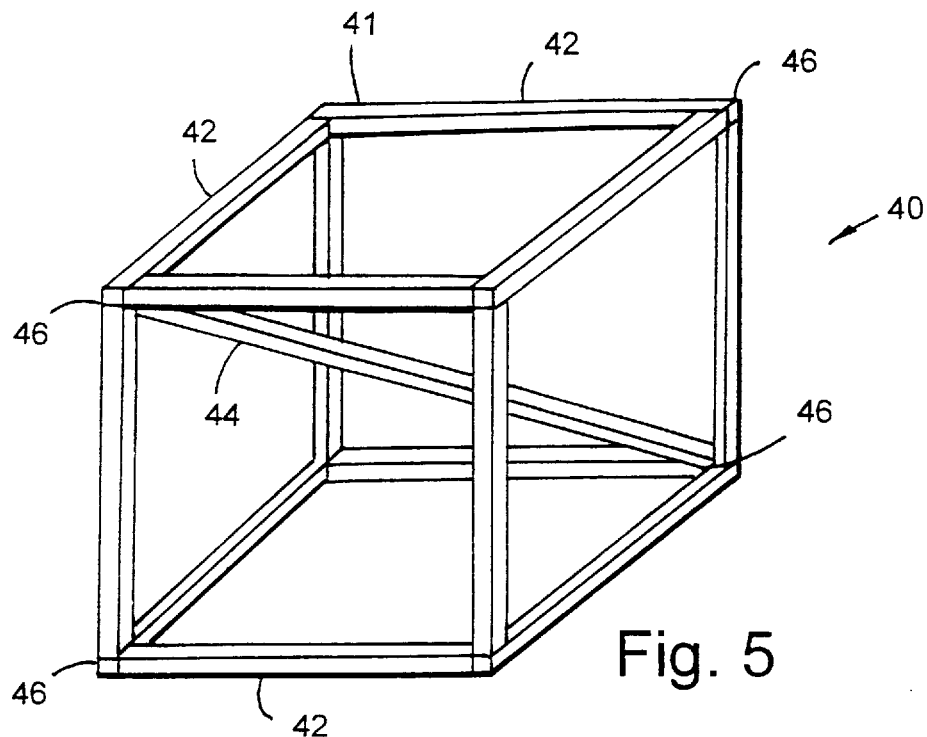
FIG. 5 is a perspective view of a cube-shaped embodiment of the device comprising a plurality of interconnected rod-like elements.

FIG. 5 shows yet another embodiment, thermal energy absorbing device 40, wherein device 40 comprises a cube 41 formed by rods 42 joined at their ends 46 in perpendicular fashion to form cube 41 having open sides and bottoms. Cube 41 is also readily stable on an inclined roof 12 so as to resist tumbling or rolling off roof 12. The open framework construction of device 40 facilitates ready contact with and deeper penetration of accumulated snow 14. One or more diagonal rods 44 can extend between nonadjacent corners of cube 41 to provide additional thermal energy transmission paths and additional area for contact with accumulated snow 14. As with device 20, rods 42 and 44 can be interconnected with apertured connectors (not shown) or molded in one piece.

Figure 6:
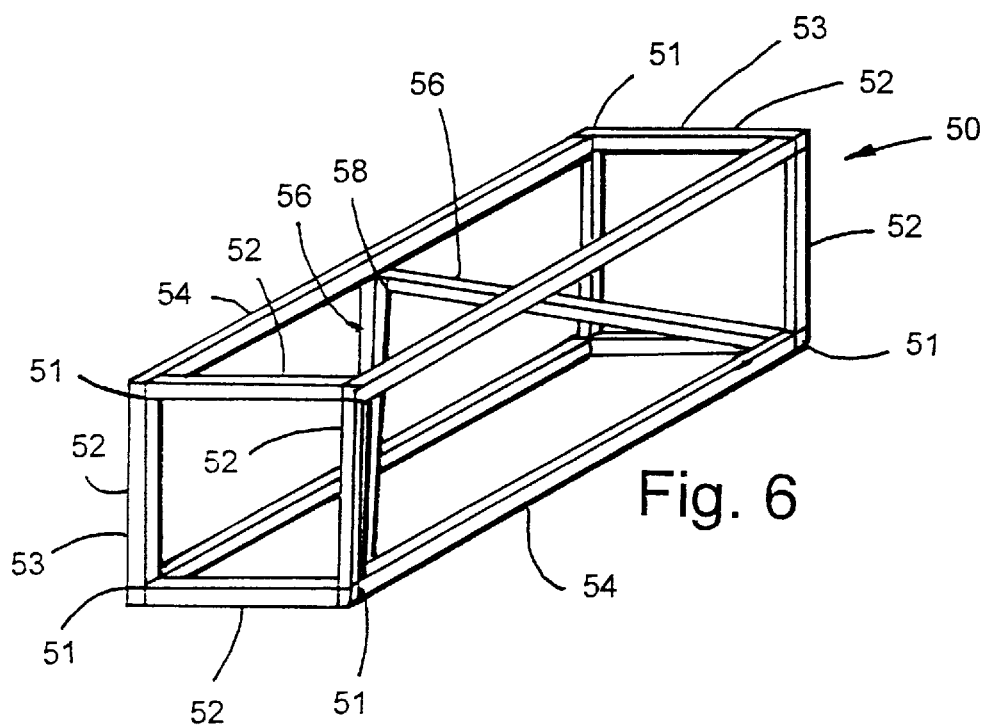
FIG. 6 is a perspective view of a regular parallelepiped embodiment of the energy absorbing device formed from interconnected rod-like elements.

FIG. 6 shows yet another alternate embodiment, solar energy absorbing device 50 which is formed as a regular parallelepiped having an elongate form with a substantially square cross section. In this embodiment, device 50 has square ends formed of substantially identical length rods 52 wherein square ends 53 are connected with long rods 54 to form the regular parallelepiped. Diagonal rods 56 may also be affixed to an internal portion of device 50 wherein a diagonal rod 56 extends from perpendicularly joined ends 51 of rods 52 and 54 to an intermediate point of a nonadjacent long rod 54. Diagonal rods 56 function to provide strength and stability to device 50 as well as adding thermal energy transmission paths and additional area for contact with accumulated snow 14. Again, device 50 can be assembled of individual rods 52 and 52 joined with connectors (not shown) or can be molded in one or more pieces.

In use, devices 40 and 50 as disclosed in FIGS. 5 and 6 can also be either placed upon or thrown upon the roof of a building to come in contact with and embedded in accumulated snow 14 in a user selected area and may also be removed from the roof 12 with an implement such as a long pole or garden rake. The planar surfaces of devices 40 and 50 also provide positional stability to prevent the devices from rolling or tumbling down inclined roof 12.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A solar energy absorbing device for melting snow from an inclined roof in combination with said inclined roof, said absorbing device comprising:

a plurality of interconnected elements, wherein said elements are elongate rectangular plates arranged to form a cruciform, wherein at least one of said elements is fabricated of solar energy absorptive moldable resin and further wherein said cruciform remains stationary when placed on an inclined roof of a building.

2. The solar energy absorbing device according to claim 1, wherein each of said rectangular plates defines a slot slightly less than a thickness of said plate and substantially at a midpoint of a long dimension of said plate extending substantially from one edge of said plate to a middle of said plate, and further wherein two of said plates are telescoped one to another at said slots to form said cruciform.

3. The solar energy absorbing device according to claim 2, wherein each of said plates has a plurality of apertures therethrough.

4. A solar energy absorbing device for melting snow from an inclined roof in combination with said inclined roof, said absorbing device comprising:

a plurality of interconnected elements, wherein said elements are rod-like elements forming a non-planar geometric frame, wherein at least one of said elements is fabricated of solar energy absorptive moldable resin and further wherein said geometric frame remains stationary when placed on an inclined roof of a building.

5. The solar energy absorbing device according to claim 4, wherein said elements are arranged to form three commonly intersecting and mutually orthogonal rods.

6. The solar energy absorbing device according to claim 5, wherein each of said rods includes a free end and further wherein each said free end is formed as a knob having a cross-sectional area greater than a cross-sectional area of said rod.

7. A solar energy absorbing device for melting snow from an inclined roof in combination with said inclined roof, said absorbing device comprising:

a plurality of interconnected elements forming a non-planar geometric frame, wherein said non-planar geometric frame is substantially in the shape of a polyhedron, wherein at least one of said elements is fabricated of solar energy absorptive moldable resin and further wherein said geometric frame remains stationary when placed on an inclined roof of a building.

8. The solar energy absorbing device according to claim 7, wherein said polyhedron is a parallelepiped.

9. The solar energy absorbing device according to claim 8, wherein said parallelepiped includes at least one element defining a diagonal of at least a portion of said parallelepiped.

10. The solar energy absorbing device according to claim 7, wherein said polyhedron is a cube.

11. The solar energy absorbing device according to claim 8, wherein said cube includes at least one element defining a diagonal of said cube.

12. The solar energy absorbing device according to claim 7 further including:

a flexible elongate member having one end attached to said geometric frame and of sufficient length to tether said geometric frame to said inclined roof thereby maintaining said geometric frame on said inclined roof.

13. The solar energy absorbing device according to claim 1 further including:

a flexible elongate member having one end attached to said cruciform and of sufficient length to tether said cruciform to said inclined roof thereby maintaining said cruciform on said inclined roof.

14. The solar energy absorbing device according to claim 4 further including:

a flexible elongate member having one end attached to said geometric frame and of sufficient length to tether said geometric frame to said inclined roof thereby maintaining said geometric frame on said inclined roof.

* * * * *